(12) United States Patent
Archbold

(10) Patent No.: US 9,289,023 B2
(45) Date of Patent: Mar. 22, 2016

(54) IMPACT ATTENUATING BLADDER WITH FLUID RELEASE CONTROL VALVE FOR HELMET LINER

(75) Inventor: Jeff Archbold, Pickering (CA)

(73) Assignee: 2156389 ONTARIO, INC., Pickering (CA)

(*) Notice: Subject to any disclaimer, the term of this patent is extended or adjusted under 35 U.S.C. 154(b) by 324 days.

(21) Appl. No.: 13/979,046

(22) PCT Filed: Jan. 9, 2012

(86) PCT No.: PCT/CA2012/000013
§ 371 (c)(1),
(2), (4) Date: Jul. 15, 2013

(87) PCT Pub. No.: WO2012/094733
PCT Pub. Date: Jul. 19, 2012

(65) Prior Publication Data
US 2013/0283506 A1    Oct. 31, 2013

Related U.S. Application Data

(60) Provisional application No. 61/431,214, filed on Jan. 10, 2011.

(51) Int. Cl.
*A42B 3/12* (2006.01)
*F41H 1/04* (2006.01)
*F16F 7/12* (2006.01)

(52) U.S. Cl.
CPC *A42B 3/121* (2013.01); *F41H 1/04* (2013.01); *F16F 7/127* (2013.01)

(58) Field of Classification Search
CPC ........... A41C 3/000021; A41C 3/0035; A41C 3/0057; A41C 3/005; A41C 3/0071; A41C 3/02; A41C 3/06; A42B 3/121; A41H 1/04; F16F 7/127

USPC ...................... 450/58, 63, 71, 73, 69, 79, 82; 2/410–414, 425

See application file for complete search history.

(56) References Cited

U.S. PATENT DOCUMENTS 3,849,801 A    11/1974    Holt et al.
3,872,511 A    3/1975     Nichols
5,343,569 A    9/1994     Asare et al.
(Continued)

FOREIGN PATENT DOCUMENTS

| CA | 2414872 | 6/2003 |
| CA | 2414972 | 6/2003 |
| GB | 2404328 | 2/2005 |

OTHER PUBLICATIONS

International Search Report, PCT/CA2012/000013, Apr. 17, 2012, 2 pp.

*Primary Examiner* — Gloria Hale
(74) *Attorney, Agent, or Firm* — Perry + Currier Inc.

(57) ABSTRACT

An impact attenuating bladder for lining a helmet shell, the bladder having: a top layer and a bottom layer of fluid impermeable material defining a fluid containment chamber; a fluid outlet in flow communication with the fluid containment chamber; and a fluid release control valve in flow communication with the outlet, the control valve having: a sacrificial elastic membrane with an inside surface in flow communication with the fluid containment chamber and an outside surface, where the outside surface is disposed in an initial configuration when the bladder contains fluid at a minimum initial pressure, and in a rupture configuration when the bladder contains fluid at a maximum rupture pressure; and a membrane rupture device with a membrane engaging tip disposed a predetermined initial distance from the membrane in the initial configuration, and engaging the membrane in the rupture configuration.

20 Claims, 3 Drawing Sheets

(56) References Cited

U.S. PATENT DOCUMENTS

| | | |
|---|---|---|
| 5,890,232 A | 4/1999 | Park |
| 8,046,845 B1 | 11/2011 | Garcia et al. |
| 8,850,623 B1 * | 10/2014 | Mazzoccoli ............ 2/413 |
| 2013/0283506 A1 * | 10/2013 | Archbold ............ 2/413 |
| 2014/0076767 A1 * | 3/2014 | McFarland ............ 206/521 |
| 2014/0259313 A1 * | 9/2014 | Sullivan et al. ............ 2/413 |

* cited by examiner

IMPACT ATTENUATING BLADDER WITH FLUID RELEASE CONTROL VALVE FOR HELMET LINER

CROSS REFERENCE TO RELATED APPLICATIONS

This application claims the benefit of U.S. provisional application No. 61/431,214, filed Jan. 10, 2011, which is incorporated by reference as if fully set forth.

FIELD OF INVENTION

The invention relates to reduction of the impact forces to a helmet wearer's head and brain through use of an impact attenuating fluid-filled bladder in a helmet liner having a valve to release fluid at a controlled flow rate when fluid pressure exceeds a predetermined maximum.

BACKGROUND

Head protection helmets conventionally use polymer foam liners to attenuate impacts and distribute impact forces over larger areas. Helmet liners may use a rigid polymer, a compressible foamed polymer, or a combination of rigid and compressible. Prior art helmet liner systems are normally designed to be durable enough to endure repeated impacts. Helmet shells are thin hard plastic to guard against puncture, cutting or scratching injuries while the foam liners spread the force of impact from the point of impact to a larger area but are not designed to dissipate appreciable amounts of impact energy.

The example of the invention described herein uses a single sacrificial gas or liquid fluid-filled bladder installed in the occipital foam liner. Bladders can be used in any number of impact locations and in practice there would ideally be between two to six bladders for any liner. However for simplicity and ease of understanding, only one bladder is shown in the example described herein. Multiple bladders could be situated in the interior shell of a helmet, with the size, location and distribution of the bladders based on expected or typical impact locations.

In the example herein an occipital foam liner of a prior art liner system was modified to include a single sacrificial gas or liquid fluid-filled bladder to dissipate impact energy by releasing the fluid when a severe impact is encountered. Below the threshold pressure, the bladder serves as a fluid-filled cushion within the foam liner. When an impact force attains a pre-selected impact maximum force, a fluid release control valve opens rapidly and fluid is released at a controlled flow rate through a flow restricting orifice preferably. The pressurized fluid, such as a liquid or gas vents to the atmosphere through the flow restricting orifice which dissipates a significant portion of the impact energy. The reduction in impact decelerations was measured to be 68% ($P<0.0001$) compared to a helmet using a standard rigid foam and compressible foam liner. When impact forces were below the selected threshold for activation of the fluid release control valve, there was a reduction in impact decelerations of approximately 23%, although this difference is not considered statistically significant due to the small number of tests used in the experiment.

Helmets are used to prevent or minimize head injury of the wearer. Expected impacts include both sharp impact, for which a helmet is intended to prevent cuts and penetration of the striking object into the head and skull, and blunt impacts, in which the head is rapidly decelerated or accelerated which can cause a concussion.

Many helmets consist of a hard polymer shell to protect against sharp impacts, with interior elastic or foam polymer padding to minimize the risk of concussive impacts.

The use of the Head Injury Criterion (HIC) parameter has been found to be an effective measure of the risk of concussive injury. HIC has been found to be linearly dependent on the acceleration or deceleration of the wearer's head at the time of impact. If the acceleration or deceleration of the head and brain within the skull is severe enough, a concussive injury could result. Conversely, decreasing the degree of acceleration or deceleration of the head and brain at the time of impact reduces the risk of concussive injury.

The conventional use of elastic or foam polymer compressible and rigid padding for the lining of a helmet tends to dissipate the forces from blunt impacts by spreading the distribution of force over a larger area and by compressing to a degree. The conventional liner of a helmet also effectively secures the helmet to the head of the wearer and prevents dislodging of the helmet on impact so that it remains in place to protect the wearer. If the helmet's foam liner is too hard, it will be uncomfortable for the wearer, and will transfer impact forces more directly to the head and brain. If the helmet liner is too soft, the helmet and liner will move around during use. To retain a soft lined helmet in place the wearer will tend to adjust the chin strap and size of the shell to make the helmet tighter, which compresses the soft padding until the compliance is reduced to be similar to that of a harder liner padding.

Accordingly for the reason explained above, some designs for helmet liner padding use an elastic polymer. The use of an elastic polymer helmet liner allows for the distance over which the head and brain decelerates upon an impact to be increased compared to a harder non-elastic helmet liner padding. The compression of the elastic polymer generally decreases the deceleration forces experienced by the head and brain, and reduces the risk of a concussive injury compared to hard foam liners.

However, if the interior helmet padding has significant elastic recovery properties, such as when expanded polypropylene (EPP) or expanded polyethylene (EPE) are used, the head and helmet rebound or reverse direction rapidly on impact. The rebound effect can increase the total accelerations experienced by the brain. Therefore elimination of rebound is desirable. Rebound of the head and brain during impact using an elastic helmet liner padding can increase the risk of a concussive injury.

Features that distinguish the present invention from the background art will be apparent from review of the disclosure, drawings and description of the invention presented below.

SUMMARY

The invention provides an impact attenuating bladder for lining a helmet shell, the bladder having: a top layer and a bottom layer of fluid impermeable material defining a fluid containment chamber; a fluid outlet in flow communication with the fluid containment chamber; and a fluid release control valve in flow communication with the outlet, the control valve having: a sacrificial elastic membrane with an inside surface in flow communication with the fluid containment chamber and an outside surface, where the outside surface is disposed in an initial configuration when the bladder contains fluid at a minimum initial pressure, and in a rupture configuration when the bladder contains fluid at a maximum rupture pressure; and a membrane rupture device with a membrane engaging tip disposed at a predetermined initial distance from the membrane in the initial configuration, and engaging the membrane in the rupture configuration.

BRIEF DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF THE PREFERRED EMBODIMENTS

Figure 3:
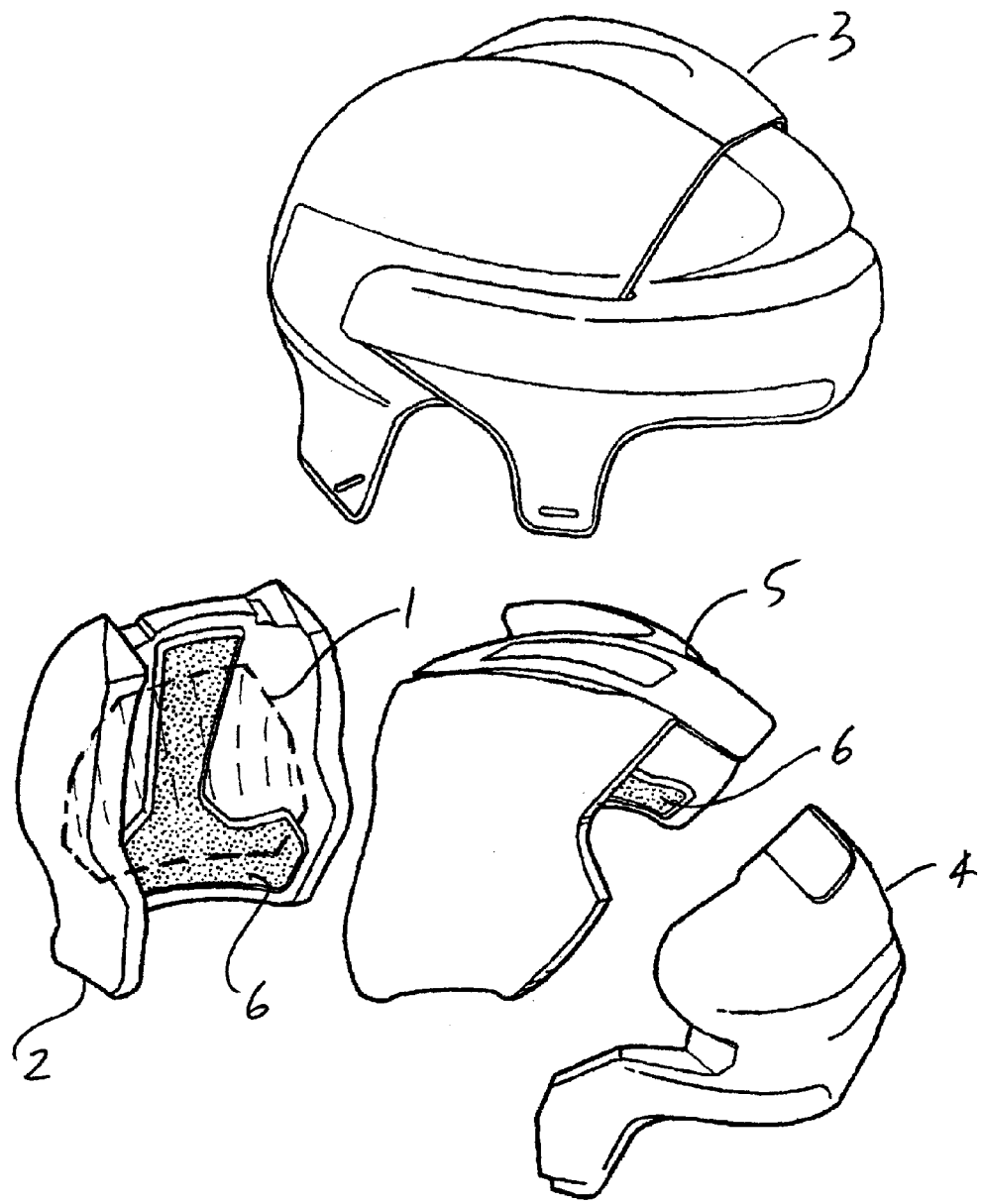
FIG. 3 is an exploded oblique view of the helmet shell with three internal foam liners, in particular showing in dashed outline the location of the fluid-filled impact attenuating bladder in the rear or occipital liner.

FIG. 3 illustrates the construction of an ice hockey helmet although it will be understood that the invention can be equally applied to any type of helmet for sport, workplace safety or military use. The shape and location of the impact attenuating bladder 1 in the hockey helmet example is located in the occipital foam liner 2 because research indicates that during hockey play, a common cause of injury is impact between the back of the head and the ice surface when a player falls backwards. The inventor used the occipital area for testing because impacts are common in the occipital area, but also because the location results in easier prototype testing. Depending on the use of the helmet, the location of the bladder 1 or the distribution of multiple bladders 1 may vary considerably.

Figure 1:
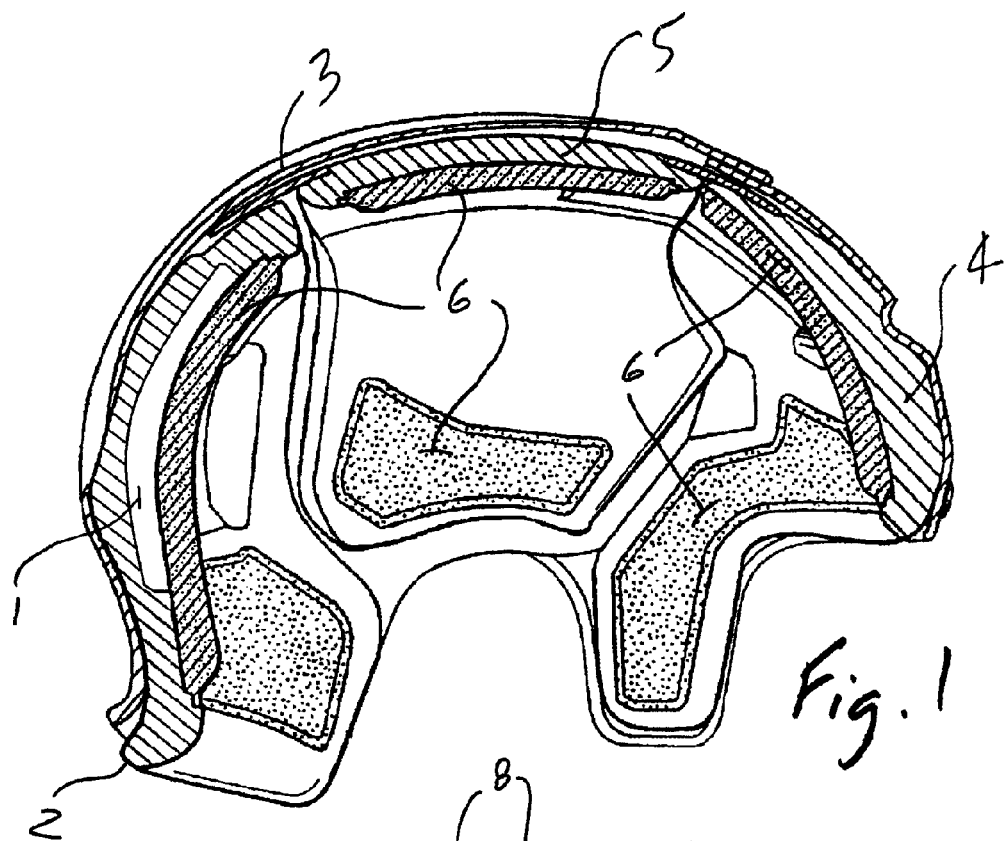
FIG. 1 is medial plane cross-sectional view through an example ice hockey helmet showing an external hard plastic shell, a hard foam liner abutting the hard plastic shell with inward soft foam pads, and a fluid-filled bladder in a rear occipital position for engaging the head of the wearer. Additional bladders can be located such that nearly complete head coverage within the helmet shell is provided. The description and illustration of only one occipital bladder is for visual clarity of drawings and ease of understanding the principle of the invention.

FIGS. 1 and 3 show the helmet construction generally used by manufacturers. An advantage of the invention is that installation of the bladder 1 merely involves hollowing out a rear portion of the occipital liner 2, by machining or modifying a mold, sufficient for the bladder 1 inflated or fluid-filled, and inserting the bladder 1 between the occipital liner 2 and the inner soft foam pad 6. The hard foam frontal liner 4 and middle liner 5, the shell 3 and all soft compliant foam pads 6 remain without modification in the example illustrated, but for actual production helmet liners, may be multiple bladders 1 within any one helmet. In the example of a hockey helmet, there could be a frontal-lateral bladder 1 on each side of the helmet, resulting in three separate bladders 1 for each liner system for example.

Figure 2:
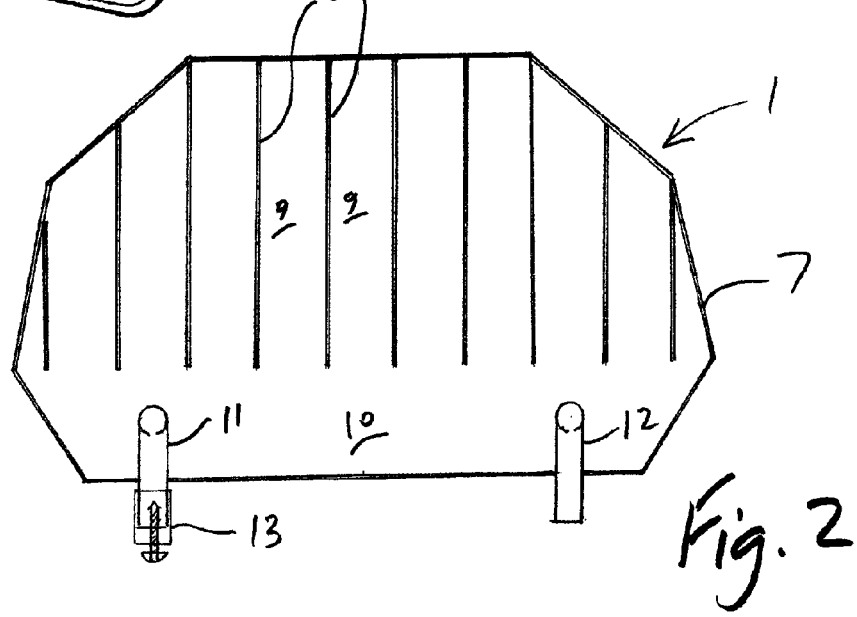
FIG. 2 is a flat view of an example of a fluid-filled bladder showing the top and bottom layers heat sealed around their periphery, heat sealed ribs defining channels and a plenum in the fluid retention chamber and the outlet and inlet tubes extending from the plenum.

As seen in FIG. 2, the impact attenuating bladder 1 can be constructed in a simple manner for air inflation with existing equipment used to manufacture inflatable air mattresses, cushions or toys. The bladder 1 is made of a top layer and a bottom layer of a substantially inelastic fluid impermeable polymer material such as thermoplastic sheets which are heat sealed together defining a fluid containment chamber between the top and bottom layers. In the example illustrated, the top layer and bottom layer are joined together to with a continuous peripheral edge seal 7 and intermediate ribs 8 by a heat sealing process to form channels 9 and a common manifold 10 within the fluid containment chamber. However it will be understood that the expanded thickness of the bladder 2 can be limited by means other than ribs 8 such as point welds, or quilting seams. In the embodiment shown, the top layer has an outlet opening about which the outlet tube 11 is sealed to communicate with the manifold 10 and channels 9. An inlet tube 12 having a one-way inlet valve (not shown) is also sealed to the top layer and communicates with the manifold 10 to inflate the bladder 1 or fill the bladder 1 with liquid. It is possible to eliminate the inlet tube 12 and inflate the bladder 1 through the outlet tube 11, however separate inlet tube 12 and outlet tube 11 serve to clearly illustrate the functions in an easily understood manner.

Figure 5:
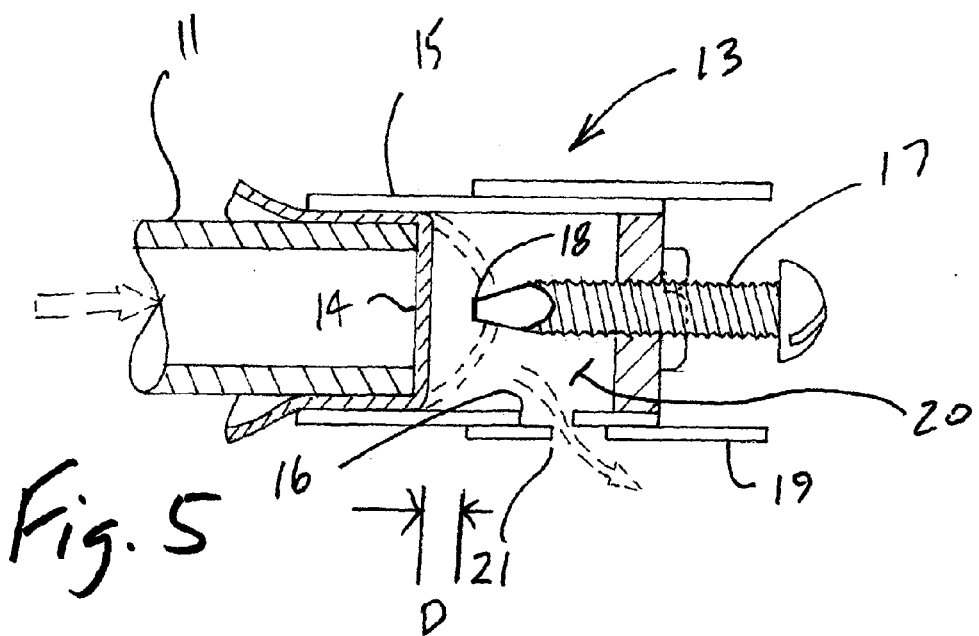
FIG. 5 is a sectional view through the outlet tube and the example fluid release control valve showing the sacrificial elastic membrane in the initial configuration (flat in solid lines) and in the rupture configuration (distended curve in dashed outline) engaging the sharp tip of the rupture device, with fluid escaping through the adjustable size flow restricting orifice.

The outlet tube 11 provides a fluid outlet in flow communication with the internal fluid containment chamber of the bladder 1 through a fluid release control valve 13 shown in FIG. 2 and in cross-section in FIG. 5. The control valve 13 is in flow communication with the outlet tube 11, manifold 10 and channels 9 to vent the air or liquid within the bladder 1 on encountering an impact as described below.

Shown in FIG. 5, the fluid release control valve 13 has a sacrificial elastic membrane 14 having an inside surface covering the end of the outlet tube 11 in flow communication with the fluid containment chamber of the bladder 1. FIG. 5 shows the membrane 14 stretched over the end of the outlet tube 14 like a drum and held in place with an end cap 15.

The outside surface of the membrane 14 communicates with ambient air through a flow restricting orifice 16 to vent air or other fluid from the bladder 1 when the membrane 14 is ruptured. The outside surface of the membrane 14 is disposed in an initial configuration shown in solid lines in FIG. 5 when the bladder 1 contains fluid at a minimum initial pressure. The initial pressure is sufficient to provide a cushioning effect during normal use. When a moderate impact is encountered, the membrane 14 extends but does not rupture.

When a severe impact is encountered, the membrane 14 extends to the rupture configuration shown in dashed outline in FIG. 5 when the bladder 1 contains fluid at a maximum rupture pressure. In the rupture configuration (dashed outline FIG. 5) the membrane rupture device 17 engages and ruptures the membrane 14 to vent air or liquid from the bladder 1 in a rapid predictable manner. The prototype membrane rupture device 17 shown as a sharpened bolt with a membrane engaging tip 18 disposed a predetermined initial distance "D" from the membrane 14 in the initial configuration, and engages the membrane 14 in the rupture configuration. A bolt was used since it allows for simple adjustment. Production versions would not likely use a bolt and may not include an adjustment feature, since experimentation can establish an optimal distance "D" depending on the application.

The control valve 13 has a flow restricting orifice 16 disposed upstream relative to the membrane 14 in the embodiment shown in FIG. 5, and the flow restricting orifice 16 has an adjustable flow area by sliding the sleeve 19 axially (left or right as shown). It will be understood that the flow restricting orifice 16 can be of fixed flow area, i.e. not adjustable, and can be located upstream from the membrane 14 to simplify construction.

In the example embodiment shown the control valve 13 can include an exhaust chamber 20 downstream of the membrane 14, and the exhaust chamber 20 has the flow restricting orifice 16 through a wall thereof. The sleeve 19 includes an opening 21 such that the sleeve 19 serves as adjustable flow restricting gate movably mounted to the exhaust chamber 20 and movable relative to the flow restricting orifice 16 between an open position and a flow restricting position over at least a portion of the flow restricting orifice 16. An orifice 16 with a fixed and not adjustable flow area will likely be used in a production helmet design since experimentation can establish an optimal orifice flow area depending on the application.

The membrane engaging tip 18 may be sharpened to form a cone however it has been found through experiment that a cone tends to seal the puncture in the membrane 14 somewhat and produces less reliable results. Preferably the membrane engaging tip 18 comprises an elongated blade edge such as the wedge shape illustrated in FIG. 5.

The distance "D" between the initial configuration of the membrane 14 and the membrane engaging tip 18 may be adjustable by adjustably mounting the membrane rupture device to the control valve 13 relative to the membrane 13 in the initial configuration. In the example illustrated, the membrane engaging tip 18 is formed as a sharpened end of a threaded shaft that is mounted in a threaded bore of the end cap 15 of the control valve 13.

For simplicity, the embodiment illustrated in FIG. 2 has an inlet tube 12 in flow communication with the manifold 10 of the bladder's fluid containment chamber, and the inlet tube 12 has a one way inlet valve (not shown) for filling the bladder with fluid. Those skilled in the art will appreciate that a single tube may be used with an inlet/outlet valve without departing from the teachings of the invention described herein. However a separate control valve 13 is described and illustrated herein to simplify the description.

To enhance detection of a severe impact that ruptures the membrane 14, the bladder 1 may be filled with an impact indicator such as: a coloured liquid dye; a coloured powder; or an unpleasant fragrance. Further to visually indicate that a severe impact has been encountered, the flow restricting orifice 16 may be covered with one of: a weak elastic balloon; or a visually detectable frangible layer.

Figure 4:
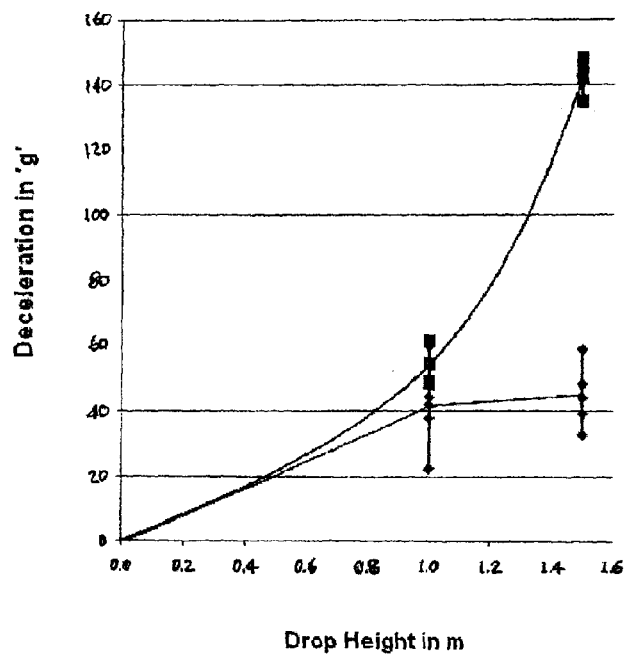
FIG. 4 is a graphical representation of the experimental drop test results showing drop height (m) versus deceleration (g's) for an occipital impact to a standard hockey helmet (upper curve) and for the same helmet fitted with an impact attenuating bladder from heights of 1.0 m and 1.5 m.

An example experiment demonstrating the effectiveness of the bladder 1 was conducted and is described below. FIG. 4 shows a graph summarizing the experimental results. A conventional helmet was tested with results shown in the upper curve and a helmet with the bladder 1 installed is shown in the lower curve. At a drop height of 1.0 meters, the membrane 14 did not rupture and the cushioning effect of the un-ruptured bladder 1 resulted in a statistically insignificant 23% reduction in deceleration. At a drop height of 1.5 meters, the membrane 14 did rupture and air venting through the orifice 16 contributed significantly to the deceleration of the model head within the helmet. The deceleration was reduced by approximately 68% (P<0.0001) indicating that expulsion of the air from the bladder 1 significantly reduced the deceleration and therefore reduced the risk of concussive injury.

EXPERIMENTAL EXAMPLE

The bladder 1 was fabricated from heat-sealed two-layer polymer. The shape was designed to fit within the occipital liner 2 of a conventional Bauer™ 5500 hockey helmet (size medium). The example bladder 1 used heat-sealed seams (7, 8) that created channels 9 to ensure that the inflated thickness of the bladder 1 was compatible with the existing standard EPS (expanded polystyrene) and foamed polyurethane (PU) occipital liner 2 for the hockey helmet shell 3.

An inlet tube 12 and an outlet tube 13 were molded and heat sealed to the bladder 1. The inlet tube 12 was used for inflation of the bladder 1 and the outlet tube 13 was used to secure the fluid release control valve 13. The initial pressure of air retained within the bladder 1 could be varied at the discretion of the tester.

The fluid release control valve 13 used a small section of nitrile sheet as a sacrificial or expendable membrane 14 which was held over the end of the outlet tube 11. As the pressure within the bladder 1 increased during an impact, the nitrile membrane 14 expanded outwards within the control valve 13, towards a sharp tip 18 of a membrane puncture device 17. When the internal pressure of the bladder 1 was sufficient, the nitrile membrane 14 was pierced by the sharp tip 18, allowing the pressurized air to escape. Nitrile material for the membrane 14 had been found to offer optimal rupture and tear properties when pierced among various polymer sheets tested.

The distance "D" from the nitrile membrane 14 to the piercing tip 18 could be adjusted, depending on the desired maximum bladder pressure and on the initial pressure of the bladder 1 prior to impact. The flow rate through the control valve 13 was adjusted by moving a sleeve 19 to cover over a portion of the flow control orifice 16 of the control valve 13. The unobstructed size of the orifice 16 was approximately 9.87 mm2. The flow restricting area could be reduced to zero using the sleeve 19.

The occipital liner 2 was machined to provide a cradle to hold the bladder 1 from a stock EPS and PU occipital liner 2 from a Bauer™ 5500 hockey helmet. A computer scan of an inflated bladder 1 bonded with adhesive to a headform was used to create a computer-model of the complementary surface to the inflated bladder 1. This surface was machined into the stock occipital liner 2, allowing for the bladder 1 to be closely supported by the machined bladder cradle in the occipital liner 2, and also resulting in similar distances between the headform and the hard outer shell 3 of the helmet.

Ventilation holes in the bladder cradle were filled with EPS that was bonded into place to ensure that the bladder 1, on impact, would be restrained and not permitted to expand, move or migrate into the ventilation holes. The PU from the stock occipital liner 2 had been removed from the EPS prior to machining. Small strips of the PU were cut and then bonded onto the bladder cradle along ridges in the bladder cradle where the seams of the bladder 1 would impact against the bladder cradle.

Two cut-outs were made in the lower area of the bladder cradle to allow for the inlet tube 12 and the outlet tube 11 holding the control valve 13.

Protective hockey helmets sold in the United States of America and Canada require certification by either the Canadian Standards Association (CSA) or the American Society for Testing and Materials (ASTM). ASTM F1045-04 is the ASTM standard for hockey helmets. CSA Z262.1-09 is the CSA standard for hockey helmets. These standards require helmets to meet retention, penetration, and shock-absorption standards for safety. ASTM F717-89 and ASTM F 429-01 are ASTM standards used for testing protective football helmets for shock-absorption.

In the cited standards for shock-absorption, the tested helmets are fastened to headforms and are dropped approximately 1.5 m (approximately 5.0 ft.) under gravity onto a flat modular elastomer programmer (MEP) target, with the MEP situated on a solid base. While there is some variation between the standards, the maximum deceleration of the combined helmet and headform is to be typically no greater than 300 g (i.e. gravities or multiples of 9.81 m/s2 acceleration or deceleration). Multiple impacts are required for each tested helmet, including multiple impacts at the same area of the helmet.

A drop-test jig was fabricated using tensioned guide-wires, similar to the test jig described in ASTM F1045-04. A magnesium headform (Size J, based on the ASTM F 2220-02) was installed onto a welded aluminum drop-assembly. Balance weights offset from the centre-of-gravity (CG) of the original headform and drop-assembly were added to the drop-assembly until the headform and drop-assembly would drop with minimal friction or binding on the tensioned guide wires. The total weight of the headform and assembly was 5165 g. This was 0.3% greater than the maximum 5150 g permitted by ASTM F1045-04, but reduced friction with 0.3% 'overweight' was preferred over increased friction and a maximum mass of 5150 g.

The target used was solid steel, and not MEP. The test was for comparative purposes between the two helmet padding systems. Tests were conducted on two helmets. One helmet was a standard stock Bauer 5500 hockey helmet of medium size, consisting of a hard outer shell 3 with EPS and PU liners (2, 4, 5, 6) for padding. The other helmet used an identical outer shell 3 from a Bauer 5500 hockey helmet of medium size, but with the standard stock EPS+PU occipital pad 2 removed, and the bladder 1 in the cradle with control valve 13 inserted into the helmet outer shell 3. The frontal liner 4 and middle liner 5 for the modified helmet were retained and were not modified. Only the occipital area of the helmet was modified and tested.

The drop heights used for the shock-absorption testing were 1.5 m and 1.0 m. The drop height of 1.5 m was used since it was the test drop height for ASTM F1045-04. The drop height of 1.0 m was used to mimic impacts of lower severity, in which the control valve 13 would not activate or rupture.

The initial inflation pressure of the bladder 1, the distance "D" from the nitrile membrane 14 to the piercing tip 18, and the size of the flow restricting orifice 16 allowed for the bladder 1 and valve 13 to be adjusted to ensure that the valve 13 did not activate during the 1.0 m drop, but did rupture or activate during the 1.5 m drop, and for the time period within which the pressurized air within the bladder 1 vented was approximately the same time period as the duration of the impact of the helmet to the target. If the pressurized air escaped too quickly, the headform would impact against the bladder cradle, which had a reduced thickness compared to the standard stock occipital liner 2. If the pressurized air escaped too slowly, the bladder 1 would act as an air-spring, and result in rebound of the headform, reducing the efficacy of the combined bladder 1, control valve 13 and liner 2 system.

After initial experimentation, it was found that inflating the test prototype bladder to approximately 76 kPa (11 psi), and using a final activation orifice dimension of approximately 3.5 mm2 (0.0055 in2) provided desirable results. Altering the initial internal pressure, the distance "D" from the nitrile membrane 14 to the piercing tip 18, the type of polymer used for the membrane 14, and adjusting the final dimension of the flow restricting orifice 16 with the sleeve 19 would all affect the energy-dissipation capabilities of the prototype helmet liner system.

The deceleration of the headform at impact was measured using a PCB Piezotronics™ model #352C04 accelerometer, mounted at the CG of the headform, as for the ASTM F1045-04 standard. The sensitivity of the accelerometer was 9.72 mV/g. The accelerometer was connected to a Data Translation™ Model #: DT9837A, and the sampling frequency was set to 2000 Hz. The output from the accelerometer was recorded on a Toshiba Satellite™ A100, Model #: PSAA5C-TA102C.

Five drop tests were performed on the standard stock helmet from a height of 1.5 m. Six drop tests were performed using the pressurized bladder occipital helmet liner system from a height of 1.5 m. For all six cases, the control valve 13 was activated.

Five drop tests were performed on the standard stock helmet from a height of 1.0 m. Five drop tests were performed using the pressurized bladder occipital helmet liner system from a height of 1.0 m. For all five test drops, the control valve 13 did not activate.

As graphically shown in FIG. 4 as the lower curve, from a drop height of 1.5 m, the average deceleration for helmet with the sacrificial pressurized fluid-filled bladder 1 with a control valve 13 was approximately 46 g, with a range of 33 g to 59 g. From a drop height of 1.5 m, shown in FIG. 4 as the upper curve, the average deceleration for standard stock helmet with the non-modified occipital pad was approximately 142 g, with a range of 135 g to 148 g.

The helmet and occipital liner 2 with the sacrificial pressurized fluid-filled bladder 1 with a fluid release control valve 13 exhibited a 68% reduction in deceleration (P<0.0001) when tested using the 1.5 m drop height compared to the non-modified standard stock helmet with the stock occipital pad.

From a drop height of 1.0 m, the average deceleration for helmet with the sacrificial pressurized fluid-filled bladder 1 with a control valve 13 (which did not activate) was approximately 41 g, with a range of 23 g to 60 g. From a drop height of 1.0 m, the average deceleration for non-modified standard stock helmet with the stock occipital pad was approximately 54 g, with a range of 48 g to 62 g. The sacrificial pressurized fluid-filled bladder 1 with a control valve 13 (which did not activate) exhibited an average 23% reduction in deceleration (P=0.0881) when tested using the 1.0 m drop height.

The sacrificial pressurized fluid-filled bladder 1 with a control valve 13 in the helmet liner system was found to significantly reduce the decelerations experienced by the headform in significant (1.5 m drop) impacts. The ability to reduce decelerations should result in a corresponding reduction in the concussive forces that would be experienced by the brain of a wearer of a helmet using this system.

The drop tests from 1.0 m confirm that the dissipation of energy by the venting of the pressurized air is critical in reducing impact decelerations. The majority of the reduction in decelerations from using the pressurized bladder system is not due to an 'air cushion' effect.

The ability to 'tune' the control valve 13 and the pressurized bladder 1 could allow for the effectiveness of the proposed helmet liner system to be optimized for wearers of all sizes and abilities. Further, by choosing an activation pressure that is below an accepted threshold for concussive injury for a given head size and weight, the risk of brain injury should be significantly reduced compared to standard stock helmet padding.

Although the above description relates to a specific preferred embodiment as presently contemplated by the inventor, it will be understood that the invention in its broad aspect includes mechanical and functional equivalents of the elements described herein.

I claim:

1. An impact attenuating bladder for lining a helmet shell, the bladder comprising:
    a top layer and a bottom layer of fluid impermeable material defining a fluid containment chamber therebetween, the fluid containment chamber shaped and sized for lining at least a portion of the helmet shell;
    a fluid outlet in flow communication with the fluid containment chamber; and
    a fluid release control valve in flow communication with the outlet, the control valve comprising:
    a frangible elastic membrane having an inside surface in flow communication with the fluid containment chamber and an outside surface, wherein the outside surface is disposable in an initial configuration when the bladder contains fluid at a minimum initial pressure, and in a rupture configuration when the bladder contains fluid at a maximum rupture pressure, whereby an increase in a pressure of the fluid against the inside surface of the membrane from the minimum initial pressure to the maximum rupture pressure distends the membrane from the initial configuration to the rupture configuration; and
    a membrane rupture device with a membrane engaging tip disposed a predetermined initial distance from the membrane in the initial configuration, and engaging the membrane in the rupture configuration.

2. The bladder according to claim 1 wherein the control valve comprises a flow restricting orifice disposed one of: upstream; and downstream relative to the membrane.

3. The bladder according to claim 2 wherein the flow restricting orifice has an adjustable flow area.

4. The bladder according to claim 2 wherein the control valve comprises:
    an exhaust chamber downstream of the membrane, wherein the exhaust chamber has the flow restricting orifice through a wall thereof.

5. The bladder according to claim 4 wherein the control valve includes an adjustable flow restricting gate movably mounted to the exhaust chamber and movable relative to the flow restricting orifice between an open position and a flow restricting position over at least a portion of the flow restricting orifice.

6. The bladder according to claim 1 wherein the membrane engaging tip comprises a cone.

7. The bladder according to claim 1 wherein the membrane engaging tip comprises a blade edge.

8. The bladder according to claim 7 wherein the membrane engaging tip comprises a wedge shape.

9. The bladder according to claim 1 wherein the membrane engaging tip is adjustably mounted to the control valve relative to the membrane in the initial configuration.

10. The bladder according to claim 9 wherein the membrane engaging tip comprises a sharpened end of a threaded shaft that is mounted in a threaded bore of the control valve.

11. The bladder according to claim 1 comprising an inlet in flow communication with the fluid containment chamber, the inlet having an inlet valve for filling the bladder with fluid.

12. The bladder according to claim 1 wherein the top layer and bottom layer are joined together to with a peripheral edge seal.

13. The bladder according to claim 1 wherein the peripheral edge seal is continuous.

14. The bladder according to claim 13 wherein one of: the top layer; and the bottom layer has an outlet opening about which the outlet is sealed.

15. The bladder according to claim 1 wherein the fluid contains an impact indicator selected from the group consisting of: colored liquid dye; a colored powder; and a fragrance.

16. The bladder according to claim 2 wherein the flow restricting orifice is covered with one of: a balloon; and a frangible layer.

17. The bladder according to claim 1 wherein the top layer and bottom layer are joined together to define a plurality of fluid retaining channels, each channel being in flow communication with the outlet.

18. The bladder according to claim 17 wherein the channels communicate with a manifold within the fluid containment chamber, and the outlet communicates with the manifold.

19. The bladder according to claim 1 wherein the top layer and the bottom layer are joined together with one or more sealing lines comprising at least one portion distal from an edge of the bladder.

20. The bladder according to claim 1 wherein the top layer and the bottom layer are joined together with one or more sealing points distal from an edge of the bladder.

* * * * *